United States Patent [19]
Wai et al.

[11] Patent Number: 5,792,357
[45] Date of Patent: Aug. 11, 1998

[54] METHOD AND APPARATUS FOR BACK-EXTRACTING METAL CHELATES

[75] Inventors: Chien M. Wai; Neil G. Smart; Yuehe Lin, all of Moscow, Iowa

[73] Assignee: Idaho Research Foundation, Inc., Moscow, Id.

[21] Appl. No.: 692,894

[22] Filed: Jul. 26, 1996

[51] Int. Cl.[6] .............................. B01D 11/00; B01D 11/02
[52] U.S. Cl. ........................ 210/638; 210/639; 210/912; 423/8; 423/21.5
[58] Field of Search .................................. 210/511, 634, 210/638, 639, 912; 423/21.1, 21.5, 22, 24, 8–10

[56] References Cited

U.S. PATENT DOCUMENTS

| | | | |
|---|---|---|---|
| 4,015,980 | 4/1977 | MacKay et al. | 75/120 |
| 4,051,223 | 9/1977 | MacKay | 423/157 |
| 4,069,273 | 1/1978 | Komoto | |
| 4,206,132 | 6/1980 | Sievers | |
| 4,275,039 | 6/1981 | Özensoy et al. | 423/54 |
| 4,457,812 | 7/1984 | Rado | 204/66 |
| 4,464,251 | 8/1984 | Kukes et al. | |
| 4,528,100 | 7/1985 | Zarchy | 210/634 |
| 4,529,503 | 7/1985 | Kukes | |
| 4,547,292 | 10/1985 | Zarchy | 210/634 |
| 4,895,905 | 1/1990 | Schneider et al. | 525/154 |
| 4,898,673 | 2/1990 | Rice et al. | 210/634 |
| 4,908,135 | 3/1990 | Brisdon et al. | 210/654 |
| 4,911,941 | 3/1990 | Katz et al. | 426/427 |
| 4,916,108 | 4/1990 | McLaughlin et al. | 502/337 |
| 4,942,149 | 7/1990 | Shinbo et al. | 502/401 |
| 5,006,254 | 4/1991 | Cailly et al. | 210/639 |
| 5,087,370 | 2/1992 | Schultheis et al. | 210/638 |
| 5,169,968 | 12/1992 | Rice | 554/193 |
| 5,274,129 | 12/1993 | Natale et al. | 549/349 |
| 5,356,538 | 10/1994 | Wai et al. | 210/634 |
| 5,606,724 | 2/1997 | Wai et al. | 423/21.1 |
| 5,641,887 | 6/1997 | Beckman et al. | 210/634 |

FOREIGN PATENT DOCUMENTS

| | | |
|---|---|---|
| 0 012 903 | 12/1979 | European Pat. Off. |
| 59-020406 | 2/1984 | Japan |
| 61-225139 | 10/1986 | Japan |
| WO92/10263 | 6/1992 | WIPO |
| 94/06450 | 6/1995 | WIPO |

OTHER PUBLICATIONS

Fujimoto, C. et al's. "The Use of Polar Modifiers in Microbore Supercritical Fluid Chromatography Combined with Inductively Coupled Plasma Spectrometry," *J. Microcolumn Separations*, 1:19–22 (1989).

Wang et al., "Recovery of Metals from Aqueous Media by Extraction with Supercritical Carbon Dioxide," *Anal. Chem.* 66:1658–1663 (1994).

Wang et al., "Selective Extraction of Mercury with Ionizable Crown Ethers in Supercritical Carbon Dioxide," *Anal. Chem.* 67:919–923 (1995).

Worthy, "Supercritical Fluids Offer Improved Separations," *C&EN,* 59:754–755 (1981).

Wai et al., patent application S/N 08/253,000 filed Jun. 2, 1994.

Wai et al., patent application S/N 08/552,941 filed Nov. 3, 1995.

(List continued on next page.)

*Primary Examiner*—Joseph W. Drodge
*Attorney, Agent, or Firm*—Klarquist Sparkman Campbell Leigh & Whinston, LLP

[57] ABSTRACT

A method of extracting metal and metalloid species from a solid or liquid substrate using a supercritical fluid solvent containing one or more chelating agents followed by back-extracting the metal and metalloid species from the metal and metalloid chelates formed thereby. The back-extraction acidic solution is performed utilizing an acidic solution. Upon sufficient exposure of the metal and metalloid chelates to the acidic solution, the metal and metalloid species are released from the chelates into the acid solution, while the chelating agent remains in the supercritical fluid solvent. The chelating agent is thereby regenerated and the metal and metalloid species recovered.

28 Claims, 1 Drawing Sheet

OTHER PUBLICATIONS

Laintz et al., "Extraction of Lanthanides from Acidic Solution Using Tributyl Phosphate Modified Supercritical Carbon Dioxide," *Analytical Chemistry*, 66:2190–2193 (1994).

Wai et al., "Preconcentration of Trace Elements by Solvent Extraction," Chapter 4, 101–132.

Brunner et al., "Zum Stand der Extraktion mit Komprimierten Gasen," *Chem. Ing. Tech.*, 53:529–542 (1981).

Liu et al., "Determination of Metals in Solid Samples by Complexation—Supercritical Fluid Extraction and Gas Chromatography—Atomic Emission Detection," *Jour. Chrom. Sci.* 31:310–316 (1993).

Liu et al., "Determination of Organotin Compounds in Environmental Samples by Supercritical Fluid Extraction and Gas Chromatography with Atomic Emission Detection," *Jour. High Resol. Chrom.* 16:106–112 (1993).

Lo et al., "Solvent Extraction of Dithiocarbamate Complexes and Back-Extraction with Mercury(II) for Determination of Trace Metals in Seawater by Atomic Absorption Spectrometry," *Anal. Chem.* 54:2536–2539 (1982).

Minczewski et al., "Liquid–Liquid Extraction," *Separation and Preconcentration Methods in Inorganic Trace Analysis* Halsted Press, New York 97–282 (1982).

Oudsema et al., "Determination of an Organotin Stabilizer in a Rigid Poly(Vinyl Chloride) Plastic by On–Line Supercritical Fluid Extraction and Chromatography with Formic Acid Modified Carbon Dioxide and Flame Ionization Detection," *Jour. High Resol. Chrom.* 16:198–202 (1993).

Tang et al., "Enhanced Extraction of Lanthanides with Crown Ether Carboxylic Acids of Increasing Lipophilicity," *Analyst* 114:451–453 (1989).

Tang et al., "Solvent Extraction of Lanthanides with Crown Ether Carboxylic Acid," *Anal. Chem.* 58:3233–3235 (1986).

Wai et al., "Supercritical Fluid Extraction of Organic and Inorganic Mercury from Solid Materials," *Talanta* 40:1325–1330 (1993).

Langenfeld et al., "Effects of Collection Solvent Parameters and Extraction Cell Geometry on Supercritical Fluid Extraction Efficiencies," *Jour. Chrom.* 594:297–307 (1992).

Lin et al., "Supercritical Fluid Extraction and Chromatography of Metal Chelates and Organometallic Compounds," *Trends in Analytical Chemistry* 14:123–133 (1995).

Lin et al., "Supercritical Fluid Extraction of Lanthanides and Actinides from Solid Materials with a Fluorinated β–Diketone," *Anal. Chem.* 65:2549–2551 (1993).

Lin et al., "Supercritical Fluid Extraction of Lanthanides with Fluorinated β–Diketones and Tributyl Phosphate," *Anal. Chem.* 66:1971–1975 (1994).

Lin et al., "Supercritical Fluid Extraction of Thorium and Uranium Ions from Solid and Liquid Materials with Fluorinated β–Diketones and Tributyl Phosphate," *Environ. Sci. Technol.* 26:1190–1193 (1994).

Cal et al., "In Situ Derivatization and Supercritical Fluid Extraction for the Simultaneous Determination of Butyltin and Phenyltin Compounds in Sediment," *Anal. Chem.* 66:1161–1167 (1994).

Ehmann et al., "Radiotracer Methods," *Radiochemistry and Nuclear Methods of Analysis*, J. Wiley & Sons, Inc., New York, pp. 313–336 (1991).

Laintz et al., "Extraction of Metal Ions from Liquid and Solid Materials by Supercritical Carbon Dioxide," *Anal. Chem.* 64:2875–78 (1992).

Burford et al., "Comparison of Methods to Prevent Restrictor Plugging During Off–line Supercritical Extraction," *Jour. Chrom.* 609:321–332 (1992).

Burford et al., "Construction of a Robust Stainless–steel Clad Fused–silica Restrictor for use in Supercritical Fluid Extraction," *Jour. Chrom.* 648:445–449 (1993).

Jinno et al., "Packed Microcolumn SFC Coupled with Photodiode Array UV Detector and Inductively Coupled Plasma Detector (SFC–Photodiode Array UV–ICP)," *Jour. Chrom.* 13:13–17 (1990).

METHOD AND APPARATUS FOR BACK-EXTRACTING METAL CHELATES

ACKNOWLEDGEMENT OF GOVERNMENT SUPPORT

This invention was funded in part by the United States Department of Energy under grant CC-S-588193-002-C; the United States government has certain rights in the invention.

FIELD OF THE INVENTION

This invention concerns the extraction of metals and metalloids from metal and metalloid chelates dissolved in a supercritical fluid.

BACKGROUND OF THE INVENTION

Metal ions and organometallic compounds are commonly separated from aqueous and solid media by chelation followed by solvent extraction. This conventional extraction procedure, however, is usually time and labor intensive. Further, conventional solvent extraction often involves the use of toxic organic compounds, creating environmental problems in connection with the handling and disposal of spent solvent.

Recently, supercritical fluid extraction (SFE) has become an attractive alternative to conventional solvent extraction for the recovery of metal ions and organometallic compounds from liquid and solid media. For example, U.S. Pat. No. 5,356,538 to Wai et al., incorporated herein by reference, discloses a method for extracting metalloid and metal species from a solid or liquid material by exposing the material to a supercritical fluid containing a chelating agent. In particular, it teaches extracting the metal ions with supercritical carbon dioxide ($CO_2$) using dithiocarbamates.

The SFE of metal ions normally involves converting the charged metal species into neutral metal chelates by introducing a suitable chelating agent into the sample. Chelating agents can be introduced either on-line or in-situ. On-line chelation, normally used for extraction of metals from liquid media samples, may be performed by introducing the chelating agents into supercritical $CO_2$ and then flowing the chelating agent containing supercritical $CO_2$ through the extraction media. In-situ chelation, typically used for extraction of metals from solid media, may be performed by adding chelating agents directly to the sample prior to exposing the extraction sample to the supercritical fluid. Both on-line and in-situ chelation have been used successfully for metal ion extraction in supercritical $CO_2$. A large variety of organic chelating agents, including dithiocarbamates, beta-diketones, tributyl phosphate and crown ethers, among others, have been used in the chelation-SFE of metal species.

Although SFE represents a significant advance in the extraction of metalloids and metals from solids and liquids, significant quantities of metal chelates appear to be lost through deposition of the metal and metalloid chelates in the extraction apparatus. Another difficulty with conventional SFE of metals or metalloids has been clogging of the restrictor, a device used to maintain pressure in the extraction apparatus. Typically the restrictor is clogged due to ice formation in extraction samples which contain water, such as solid samples in which a small amount of water is usually added to improve extraction efficiency.

Another problem with conventional SFE methods has been the breakage of fused-silica restrictors when particular modifiers are used to increase the solvation power of supercritical $CO_2$. Such breakages may expose the human operator to a significant risk of harmful exposure when samples containing radioactive or toxic substances are being extracted.

Finally, conventional SFE methods require repressurization of the supercritical fluid prior to the next extraction. Repressurization of the supercritical fluid is a costly and time-consuming process.

Given the foregoing problems and limitations of existing SFE methods, a primary object of this invention is to decrease loss of chelated metals and metalloids during the extraction procedure and regenerate the chelating agents for use in a following extraction process.

Another object of the present invention is to provide a back extraction method for the efficient and effective extraction of metal and metalloid chelates from the supercritical fluid solvent allowing reuse of the supercritical fluid in another extraction process with decompression and repressurization of the supercritical fluid.

Another object is to provide a novel extraction apparatus having on-line back-extraction capability.

Another object of the invention is to reduce or eliminate the clogging of restrictors.

Another object of the invention is to reduce or eliminate the breakage of fused-silica restrictors due to the use of supercritical fluid modifiers, making extraction a safer and more effective process.

Another object of the invention is to provide a continuous method of SFE extraction which avoids the need for decompression and repressurization of the supercritical fluid for successive extractions.

SUMMARY OF THE INVENTION

The present invention includes both a method and an apparatus for extracting metal and metalloid species from liquid or solid media (also referred to herein as substrate or sample). To perform the method of the invention, the substrate is exposed to a supercritical fluid solvent containing a chelating agent for a period of time sufficient for the chelating agent and the metal or metalloid to form metal or metalloid chelates, the metal or metalloid chelates being soluble in the supercritical fluid. In a working embodiment, the supercritical fluid is continuously flowed over the extraction media (i.e., dynamic extraction). However, the fluid extraction may also be performed statically. Good results are achieved when the supercritical fluid comprises supercritical carbon dioxide. After the metal metalloid chelates are formed in the supercritical fluid, the supercritical fluid is separated from the extraction media.

The metal chelates dissolved in the supercritical fluid are then exposed to an acidic solution, thereby causing the metal and metalloid species to be released from the chelates into the acidic solution. The chelating agent remains dissolved in the supercritical fluid. Preferably, the acidic solution is a mineral acid solution. Good results are achieved when the acidic solution is nitric acid, sulfuric acid, hydrochloric acid, and mixtures thereof. Excellent results are achieved when the acidic solution is nitric acid.

The chelating agent may be any chelating agent capable of forming metal and metalloid chelates. Currently preferred chelating agents include, but are not limited to, β-diketones, halogenated β-diketones, phosphinic acids, halogenated phosphinic acids, carboxylic acids, halogenated carboxylic acids, and mixtures thereof. Good results are achieved when at least one of the chelating agents is halogenated. Excellent results are achieved when at least one of the chelating agents is fluorinated.

A working embodiment of the present invention includes the step of exposing the media to a modifying solvent added to the supercritical fluid to improve the solvent characteristics thereof. Suitable modifying solvents include, but are not limited to, water, low to medium boiling point alcohols and esters, and phosphate esters.

Metals and metalloids may be extracted from liquid and solid media utilizing the method and apparatus of the present invention.

The apparatus of the present invention includes a heating chamber with an extraction vessel located inside the heating chamber. The extraction vessel is coupled to a source of supercritical fluid by a fluid conduit that extends to the base of the extraction vessel. A back-extraction vessel, also located inside the heating chamber, is fluidly coupled to the extraction vessel and an outlet valve. A pressure restrictor is coupled to both the outlet valve and a collector vessel. Preferably, the extraction vessel and the outlet valve are placed in a vertical orientation. In working embodiments, the outlet valve is a fused-silica outlet valve. Good results have been achieved when the outlet valve comprises a fused-silica outlet valve placed inside a hollow tube.

DETAILED DESCRIPTION OF PREFERRED EMBODIMENTS

Figure 1:
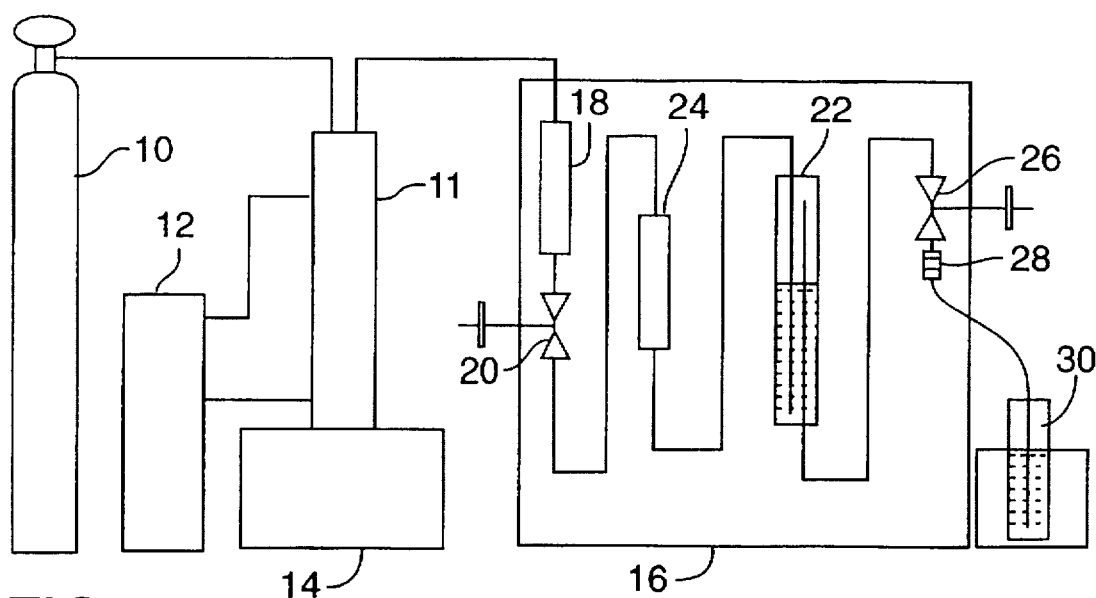
FIG. 1 is a schematic diagram of a supercritical fluid extraction apparatus including the on-line back-extraction device of the present invention.

The present invention concerns a method and apparatus for extracting metal and metalloid species using supercritical fluids by forming metal and metalloid chelates and then back-extracting the metals and metalloids from the chelates using an acidic solution. The back-extraction is performed without decompressing the supercritical fluid.

The chelation-SFE process which precedes the back-extraction is a method of extracting metalloids or metals from solid or liquid media by exposing the media to a supercritical fluid containing a chelating agent that forms a metal and mtalloid chelate. Preferably, the extraction fluid includes at least one chelating agent and a solvent modifier. The metal and metalloid chelates formed are soluble in the supercritical fluid, allowing efficient extraction of the metals and metalloids from the media.

Metalloids are elements with both metallic and nonmetallic properties, and include arsenic, selenium and tellurium. A metal is an element that forms positive ions in solution, and produces oxides that form hydroxides, rather than acids, with water. Metals include alkali metals, alkali-earth metals, transition metals, noble metals (including the precious metals gold, platinum and silver), rare metals, rare-earth metals (lanthanides), actinides (including the transuranic metals), light metals, heavy metals, synthetic metals and radioactive metals. Specific examples are given herein of extraction methods for extracting lanthanides and actinides (collectively referred to as the f-group elements from the filling of their 4f and 5f orbitals). The f-group elements are commonly produced by nuclear fission reactions, and the actinides are radioactive. Transition metals are commonly used or produced in many industrial processes and products, such as mineral production or fly ash.

Suitable fluids and/or supercritical fluids for use in the present invention include carbon dioxide, nitrogen, nitrous oxide, methane, ethylene, propane and propylene. (See Table I) Carbon dioxide is a particularly preferred fluid for both subcritical and supercritical fluid extractions because of its moderate chemical constants ($T_C$=31° C., $P_C$=73 atm) and its inertness (i.e. it is non-explosive and thoroughly safe for extractions, even extractions performed at supercritical conditions). Carbon dioxide also is a preferred solvent because it is abundantly available and relatively inexpensive. Virtually any condition above the critical temperature and pressure for carbon dioxide is acceptable for producing a supercritical carbon dioxide fluid solvent useful for practicing the extraction process of the present invention.

The fluids listed in Table I may be used either individually or in combination, as mixed fluids or supercritical fluid solvents to practice the present invention.

TABLE I

PHYSICAL PARAMETERS OF SELECTED SUPERCRITICAL FLUIDS*

| Fluid | Molecular Formula | $T_c$ (°C.) | $p_c$ (atm) | $\rho_c$ (g/ml) $\rho 400_{atm}$** |
|---|---|---|---|---|
| Carbon dioxide | $CO_2$ | 31.1 | 72.9 | 0.470.96 |
| Nitrous oxide | $N_2O$ | 36.5 | 71.7 | 0.450.94 |
| Ammonia | $NH_3$ | 132.5 | 112.5 | 0.240.40 |
| η-Pentane | $C_5H_{12}$ | 196.6 | 33.3 | 0.230.51 |
| η-Butane | $C_4H_{10}$ | 152.0 | 37.5 | 0.230.50 |
| η-Propane | $C_3H_6$ | 96.8 | 42.0 | 0.22 — |
| Sulfur hexafluoride | $SF_6$ | 45.5 | 37.1 | 0.741.61 |
| Xenon | Xe | 16.6 | 58.4 | 1.102.30 |
| Dichlorodifluoromethane | $CCl_2F_2$ | 111.8 | 40.7 | 0.561.12 |
| Trifluoromethane | $CHF_3$ | 25.9 | 46.9 | 0.52 — |
| Methanol | $CH_3OH$ | 240.5 | 78.9 | 0.27 — |
| Ethanol | $C_2H_5OH$ | 243.4 | 63.0 | 0.28 — |
| Isopropanol | $C_3H_7OH$ | 235.3 | 47.0 | 0.27 — |
| Diethyl ether | $(C_2H_5)_2O$ | 193.6 | 36.3 | 0.27 — |
| Water | $H_2O$ | 374.1 | 218.3 | |

*data from Matheson Gas Data Book (1980) and CRC Handbook of Chemistry and Physics (CRC Press, Boca Raton, Florida 1984).
**$T_r$ = 1.03

In addition, a modifying solvent (also referred to as a modifier) may be added to the fluid, including supercritical fluids, to improve the solvent characteristics thereof. Currently, the most useful modifying solvents include water, organic solvents, such as low to medium boiling point alcohols and esters, particularly the lower alkyl alcohols and esters, such as methanol, ethanol, ethyl acetate and the like; and phosphate esters, particularly lower alkyl phosphate esters, such as tributyl phosphate. With more specificity, but without limitation, the modifiers are usually added to the fluids at proportions of between about 0.1% and 20.0% by weight. The modifiers contemplated for use herein are most typically not supercritical fluids at the disclosed operating conditions. Rather, the modifiers are simply dissolved in the fluid solvents, including the supercritical fluid solvents, to improve their solvent properties.

In one embodiment, the chosen enhancer is combined with a supercritical fluid at the described proportions prior to feeding the supercritical fluid to the extraction vessel. Alternatively, the supercritical fluid is fed to the extraction vessel without the enhancer. The enhancer is then introduced into the extraction vessel and thereby combined with the supercritical fluid.

I. Chelating Agents

Chelating agents useful for solubilizing metals and metalloids in supercritical fluids are listed in Table II. The list of chelating agents useful for practicing the present invention is for illustration only. Many other chelating agents, now known or hereafter discovered that are useful for forming metal and metalloid chelates, also may be used.

TABLE II

COMMONLY USED METAL CHELATING AGENTS

Oxygen Donating Chelating Agents

Cupferron
Chloroanillic acid and related reagents
β-diketones and related reagents
N-Benzoyl-N-phenylhydroxylamine and related reagents
Macrocyclic compounds
Nitrogen Donating Chelating Agents α-dioximines
Diaminobenzidine and related reagents
Porphyrines and related reagents
Oxygen and Nitrogen Donating Chelating Agents 8-Hydroxyquinoline
Nitrosonapthols and nitrosophenols
EDTA and other complexionates
Diphenylcarbazide and diphenylcarbazone
Azoazoxy BN
Sulfur or Phosphorus Donating Chelating Agents Sodium diethlydithiocarbamate and related reagents
Dithizone and related reagents
Bismuthiol II
Thiothenoyltrifluoracetone
Thioxine
Thiophosphinic acids
Phosphine Sulfides
Phosphorothioic acids
Tributylphoshpate and related reagents

II. Extraction Apparatus

One proposed embodiment of the extraction/back extraction apparatus of the present invention is illustrated in FIG. 1. A supercritical grade solvent (available from Scott Specialty Gases, Plumsteadville, Pa.) is supplied from cylinder 10, to liquid $CO_2$ reservoir 11, cooled by a coolant circulator 12 and delivered to the SFE system by a pump 14 (preferably a Haskell pump from Haskel Inc., Burbank, Calif.).

The supercritical fluid extractor system of the present invention preferably comprises a temperature-controlled oven 16, a temperature equilibration device 18, an inlet valve 20, an extraction vessel 22, a liquid vessel 24 for on-line back-extraction, an outlet valve 26, a restrictor 28 and a collection vessel 30. In one embodiment of the invention, the temperature equilibration device 18 and extraction vessel 22 each have a volume of 3.5 ml (available from Dionex, Sunnyvalve, Calif.).

The liquid vessel 24 for on-line back-extraction can be modified from a commercial supercritical fluid extraction vessel (available from Dionex), preferably 1.0 cm in diameter by 13 cm in length and having a volume of 10 ml. The inlet valve 20 is preferably extended to the base of the vessel to allow the supercritical fluid to flow through the liquid vessel from the base of the vessel to the top of the vessel and out through outlet valve 26. The extraction vessel 22, liquid vessel 24, and outlet valve 26 are placed in oven 16, preferably controlled to within ±0.1° C. utilizing an Omega BS5001J1 bench top temperature controller (available from Omega, Stamford, Conn.).

Figure 3:
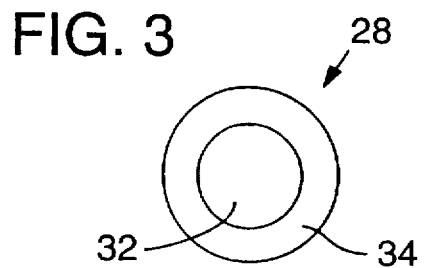
FIG. 3 is a schematic diagram of a preferred restrictor for use with the extraction apparatus of the present invention.

Restrictors suitable for use in the present invention include, but are not limited to, stainless steel restrictors, fused-silica capillary restrictors and fused-silica 32 capillary restrictors inserted into tubing, preferably PEEK tubing 34 (see FIG. 3). The stainless steel restrictor is preferably about 50 μm in diameter and 48 cm in length (available from ISCO Inc.). The fused-silica capillary restrictor is preferably 50 μm i.d.×375 μm o.d. (available from J&W Scientific, Folsom, Calif.). The PEEK tubing is preferably 0.020" i.d.×1/16" o.d. (available from Upchurch Scientific, Oak Harbor, Wis.).

The restrictor 28 is preferably connected directly to the outlet valve 26 located inside the oven. One-half of the restrictor capillary is preferably inside oven 16 and the other half extends outside the oven by inserting the capillary through a small hole in the oven wall. The portion of the restrictor outside the oven is inserted into a solvent-containing collection vessel 30. The collection vessel is preferably placed in a room-temperature water bath to prevent the temperature of the collection solvent from dropping below 0° C.

As illustrated in Example IV below, the orientation of the extraction vessel 22 and the outlet valve 26 may be very important for effective recovery of metal and metalloid chelates. Specifically, when the extraction vessel 22 and outlet valve 26 are both positioned in a horizontal orientation, and the outlet valve is located outside the oven, metal and metalloid chelate recovery is substantially lower than when the extraction vessel and outlet valve are both positioned in a vertical orientation, and the outlet valve is located inside the oven.

III. The Extraction Method of the Present Invention

The present invention provides a method for extracting metal and metalloids from solid or liquid media, including back-extracting the metal or metalloids from the metal and metalloid chelates solubilized in a supercritical fluid after the initial extraction. Preferably, the supercritical fluid is supercritical $CO_2$. The method includes first forming metal and metalloid chelates by exposing the solid or liquid media to a supercritical fluid containing a suitable chelating agent. Once the metal and metalloid chelates are formed, the supercritical fluid containing the dissolved chelates is separated from the solid or liquid media and exposed to an acidic solution. Good results are achieved when the acidic solution is a mineral acid solution. A nitric acid solution, hydrochloric acid solution, or a sulfuric acid solution have been found to give excellent results. Exposure of the supercritical fluids containing the chelates to the acidic solution causes the metal and metalloid chelates to decompose into their component metal and metalloid ions and chelating agents. The ions are released into the acidic solution, while the chelating agents remain in the supercritical fluid. Following decomposition of the metal and metalloid chelates, the supercritical fluid containing the chelating agent(s) is separated from the acidic solution which contains the metal and metalloid ions.

IV. Working Examples

The following examples are provided to describe specific features of the invention. Accordingly, the invention should not be limited to the specific features described.

EXAMPLE I

This example illustrates a process for the back-extraction of lanthanides from their respective lanthanide chelates following the initial supercritical fluid chelation extraction of the lanthanides from solid media samples.

Specifically, radioisotopes $^{140}La$ and $^{177}Lu$ were extracted. These radioisotopes were used as radiotracers to follow the process of in-situ supercritical fluid chelation extraction of $La^{3+}$ and $Lu^{3+}$ from solid media using hexafluoroacetylacetone (HFA) plus tributylphosphate (TBP) as chelating reagents. By this method, on-line back-extraction results were compared with results obtained from the conventional method of collecting metal and metalloid chelates (i.e., collecting the chelates following decompression of the supercritical fluid).

HFA and TBP were purchased from the Aldrich Chemical Co. (Milwaukee, Wis.) and were used without further purification. Solutions of $La^{3+}$ and $Lu^{3+}$ were prepared from their nitrate salts, also obtained from Aldrich, and were of analytical reagent grade as were all other chemicals in this example. Radioisotopes $^{140}La$ (E$\gamma$=487 KeV, t1/2=40.2 h) and $^{177}Lu$ (E$\gamma$=208 KeV, t1/2=6.7 d) were produced by neutron activation. A solution containing about $2.0\times10^{-3}$ molar each of $La^{3+}$ and $Lu^{3+}$ in a solution of about 0.01 molar nitric acid ($HNO_3$) was irradiated for about one hour in a 1 MW Trigar nuclear reactor at a steady flux of $6\times10^{12}$ n cm$^{-2}$s$^{-1}$. After irradiation, the pH of the solution was adjusted by adding sodium acetate until the pH was about 4.0.

Filter papers used as a solid media sample were obtained from Whatman Ltd. (Maidstone, England) and were prepared by adding about 5 µL each of about $2.0\times10^{-3}$ molar $La^{3+}$ and $Lu^{3+}$ solutions containing the radioisotopes $^{140}La$ and $^{177}Lu$, respectively, on separate filter paper strips. Soil samples were prepared by adding about 25 µL each of irradiated $La^{3+}$ and $Lu^{3+}$ solutions on separate 500 mg topsoil samples. The top soil samples were collected from northern Idaho. The soil samples containing the $La^{3+}$ and $Lu^{3+}$ were allowed to dry at room temperature, then mixed thoroughly. A soil sample of about 100 mg was used for each extraction.

A glass tube (0.5 cm in diameter and 3 cm in length) was plugged at one end with a piece of glass wool. A spiked filter paper or a 100 mg soil sample was inserted into the open end of the glass tube. For filter paper, 10 µL water, 30 µL HFA, 20 µL TBP and 20 µL methanol were introduced sequentially to the sample. For the soil sample, 20 µL water, 50 µL HFA, 25 µL TBP and 50 µL methanol were added to the sample sequentially. The open end of the glass tubes was then plugged with a piece of clean glass wool.

Figure 2:
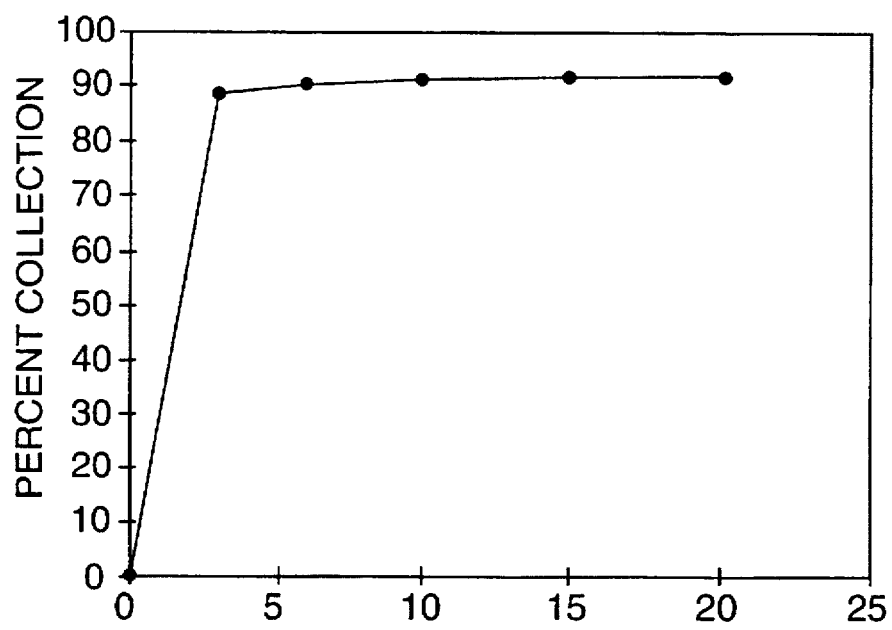
FIG. 2 is a graph of the rate of lanthanide ion extraction.

The sample tube was placed immediately into the extraction vessel and installed in the SFE oven upstream of the liquid vessel. The liquid vessel contained about a 6 ml of about a 50% $HNO_3$ solution. The temperature of the oven was set at about 60° C., and the sample vessel and liquid vessel were pressurized to about 200 atm. The chelation and the extraction processes were allowed to proceed under static SFE conditions for about 10 minutes. The outlet valve was then opened and the sample was then extracted and flushed through the system under dynamic conditions for 15 minutes. The results of these extractions are depicted in FIG. 2, which shows an extraction efficiency of approximately 90%, most of which occurred in the first two to three minutes of the dynamic extraction process.

After the supercritical fluid chelation extraction the on-line back-extraction was used to decompose the metal chelates into their component metal and metalloid ions and chelating agent(s). As shown in FIG. 1, the back-extraction apparatus includes a liquid (or back-extraction) vessel installed between the extraction vessel and the outlet valve.

During the dynamic extraction step, the metal chelates were extracted from the sample and flushed through the liquid vessel containing about 6 ml of about 50% $HNO_3$ solution. On-line back-extraction occurred as the supercritical $CO_2$ containing the chelates diffused through the nitric acid solution. Metal chelates were decomposed into the component chelating agent(s) and metal ions. The metal ions were released into the nitric acid solution, while the chelating agent(s) remained dissolved in the supercritical $CO_2$.

To determine the efficiency of the on-line back-extraction method of the present invention, the quantity of radioactive metal chelates ("radiotracers") collected in a trapping solution of methylisobutylketone (MIBK), both with and without on-line back-extraction, were measured. The results, summarized in Table III show that when the on-line back-extraction method of the present invention is used, greater than 90% of the lanthanides were recovered in the liquid vessel, whereas when on-line back-extraction is not used, from 80 to 90% of the lanthanides remain in the MIBK solution. Thus, the metal ions are effectively removed from the supercritical fluid while the chelating agents are regenerated and remain in the supercritical fluid and may be used for the next extraction.

TABLE III

| Sample No. | Percent Element Extracted | | On-Line Recovery with 50% $HNO_3$ | | Percent Extracted with MIBK | |
|---|---|---|---|---|---|---|
| | La | Lu | La | Lu | La | Lu |
| Paper #1 | 99 | 99 | 88 | 90 | 7 | 6 |
| Paper #2 | 99 | 99 | 90 | 86 | 5 | 7 |
| Paper #3 | 99 | 100 | NO* | NO | 80 | 90 |
| Paper #4 | 99 | 100 | NO | NO | 85 | 91 |
| Soil #1 | 98 | 98 | NO | NO | 90 | 92 |
| Soil #2 | 98 | 96 | NO | NO | 89 | 90 |

*Extractions were conducted without an on-line extraction device.

EXAMPLE II

The extraction method illustrated in EXAMPLE I using non-radioactive lanthanide isotopes.

EXAMPLE III

The extraction method illustrated in EXAMPLE I using uranium.

EXAMPLE IV

This example illustrates the significant impact of extractor vessel and outlet valve orientation on the overall efficiency of the extraction process. First, a collection vessel containing about 6 ml MIBK was used to trap the metal chelates obtained in connection with EXAMPLE I that remained in the restrictor device of the extraction apparatus. After extraction, the extracted sample was removed from the extraction vessel and the remaining radioisotopes were counted in a large-volume Ortec Ge(Li) detector with a resolution (fwhm) of ~2.3 KeV at the 1332 KeV $^{60}Co$ peak. A filter paper strip or 100 mg soil containing the same amount of the irradiated $La^{3+}$ and $Lu^{3+}$ ions as the extraction samples was used as a standard and counted under identical conditions.

The extraction efficiencies (percent removal) were calculated based on the amount of the radioactive lanthanides found in the filter paper or soil sample before and after the extraction. The nitric acid solution in the liquid vessel and MIBK solvent in the collection vessel were each transferred to a PEEK bottle and counted in the Ge(Li) detector. A solution of about 6 ml of about 50% $HNO_3$ containing about 5 µL each of irradiated $La^{3+}$ and $Lu^{3+}$ ions was used as the standard.

After each extraction, a portable Geiger-Muller Counter (Model PUG-1, Technical Associates, Burbank, Calif.) was used to trace the radioactivity in each part of the extractor. This was done to estimate the amount of lanthanide lost in different parts of the extraction system during the extraction process. Each part of the extraction system was disconnected and the radioactivity remaining in the sample extraction vessel, connection tubing, liquid vessel, outlet valve and restrictor was detected both with a Geiger-Muller Counter and a Ge(Li) detector. Detailed counting procedures using the Ge(Li) detector are described in J. Tang, C. M. Wai, Anal. Chem., 58:3233 (1986), incorporated herein by reference.

As shown in Table IV below, radiotracer monitoring demonstrated that when the extraction vessel and outlet valve were both positioned in a horizontal orientation, and the outlet valve was located outside the oven, metal chelate recovery was only 78%. When the extraction vessel and outlet valve were positioned in a vertical orientation, and the outlet valve located inside the oven, as shown in FIG. 1, the recovery of metal chelates improved substantially to 92%.

When the fused-silica restrictor was secured inside a PEEK tube, restrictor breakage did not occur during a test lasting about six hours.

By comparison, the stainless steel restrictor was more robust and could be de-plugged by blowing hot air with a heat gun, a procedure which causes fused-silica restrictors to become brittle. Unfortunately, stainless steel restrictors are considerably more expensive than fused-silica restrictors. However, for safety reasons, the stainless steel restrictor is preferred when radioisotopes are used.

EXAMPLE VI

Off-Line Back-Extraction of La(III) and Lu(III) from the MIBK Trapping Solution

For conventional metal ion analysis with neutron activation analysis (NAA), atomic absorption spectroscopy (AAS) or inductively coupled plasma-mass spectrometry (ICP-MS), the sample to be extracted is preferably prepared in an aqueous solution. Under such conditions it is necessary to back-extract the metal ions from the metal chelates trapped in a MIBK solution.

TABLE IV

| Extraction Cell Orientation | Outlet Valve Orientation and Location | Percent Radiotracers Remaining in Filter Paper | Percent Radiotracers remaining in Extraction Cell and Its Fittings | Percent Radiotracers Deposited in Outlet Valve and Fittings | Percent Radiotracers Deposited inside Connection Tubing and the Restrictor | Percent Radiotracers Tapped in MBK |
|---|---|---|---|---|---|---|
| Horizontal | Horizontal Outside the Oven | 1.0 | 8 | 6 | 1.0 | 78 |
| Vertical | Vertical Inside the Oven | 1.0 | <1 | 2 | 1.0 | 92 |

To determine where metal chelates were lost in the extraction process when the liquid vessel and outlet valve are placed in a horizontal orientation, the extraction vessel, outlet valve, connection fittings, tubing and restrictor were all disconnected and washed with MIBK and a nitric acid solution. The washed radiotracer was counted with Ge(Li) detector and the percentage of radiotracer remaining in each part was calculated. The results show that most of the lost radiotracer was deposited inside the extraction vessel and its fittings (8%) and the outlet valve and its fittings (6%).

EXAMPLE V

This example compares the efficacy of three different restrictors used in the apparatus of the invention. An inexpensive, simple, robust, flexible and disposable restrictor was constructed by securing a fused-silica capillary restrictor inside a PEEK tube. For comparison, a commercial stainless steel restrictor obtained from ISCO and a bare fused-silica restrictor were also used. For the bare fused-silica restrictor, the capillary became brittle and usually broke after about 40 minutes to 1 hour when a solution of polar $CO_2$-methanol (95:5) was continuously flowed through a liquid vessel containing about 6 ml water. The location of the break in the fused-silica restrictor occurred most frequently at a point outside the oven about 3–5 cm from the exit. Without being bound to any particular theory, the break location is likely due to the vibration of the restrictor caused by the expansion of depressurized $CO_2$.

To test the efficiency of the back-extraction, about a 5 ml MIBK solution containing $^{140}$La and $^{177}$Lu radiotracers extracted from spiked filter paper samples was back-extracted with about 5 mls of a solution of about 50% $HNO_3$ for about 5 minutes. The results of the back-extraction, summarized in Table V show that excellent back-extraction of the metal chelates is obtained utilizing this method of the present invention. Such efficient back-extraction allows regeneration of the chelating agent(s) in the supercritical fluid.

TABLE V

| | γ-Activity (Counts/5 min) | |
|---|---|---|
| | La (487 KeV) | Lu (207 KeV) |
| Organic Phase before Back Extraction (MIBK Collection Solution) | 7943 + 90 | 2744 + 53 |
| Organic Phase after Back Extraction (MIBK) | 151 + 13 | 36 + 7 |
| Aqueous Phase after Back Extraction (50% $HNO_3$) | 7788 + 88 | 2662 + 51 |
| Percent Back Extraction | La = 98 | Lu = 97 |

In view of the many possible embodiments to which the principles of our invention may be applied, it should be recognized that the illustrated embodiments are only preferred examples of the invention and should not be taken as a limitation on the scope of the invention. Rather, the scope of the invention is defined by the following claims. We therefore claim as our invention all that comes within the scope and spirit of these claims.

We claim:

1. A method for extracting metal and metalloid species from a substrate, comprising:

exposing the substrate containing metal and metalloid species to a supercritical fluid solvent containing at least one chelating agent for a period of time sufficient for the at least one chelating agent and the metal and metalloid to form metal and metalloid chelates, the metal and metalloid chelates being soluble in the supercritical fluid;

separating the supercritical fluid from the substrate after the metal and metalloid chelates are in the supercritical fluid, and exposing the metal and metalloid chelates in the supercritical fluid to an acidic solution while maintaining a pressure and/or temperature sufficient to maintain the fluid solvent supercritical, thereby causing the metal and metalloid species to be released from the metal and metalloid chelates into the acidic solution.

2. The method according to claim 1 wherein the acidic solution is a mineral acid solution.

3. The method according to claim 1 wherein the acidic solution is selected from the group consisting of a nitric acid solution, a sulfuric acid solution, a hydrochloric acid solution, and mixtures thereof.

4. The method according to claim 3 wherein the acidic solution is a nitric acid solution.

5. The method according to claim 1 wherein the at least one chelating agent remains in the supercritical fluid after the metal and metalloid species are released into the acid solution from the metal chelates.

6. The method according to claim 1 wherein the at least one chelating agent is selected from the group consisting of β-diketones, halogenated β-diketones, phosphinic acids, halogenated phosphinic acids, carboxylic acids, halogenated carboxylic acids, thiophosphinic acids, phosphine sulfides, phosphorothioic acids, and mixtures thereof, at least one of the chelating agents forming metal and metalloid chelates with the metal and metalloid species.

7. The method according to claim 6 wherein at least one of the chelating agents is halogenated.

8. The method according to claim 7 wherein at least one of the chelating agents is fluorinated.

9. The method according to claim 1 wherein the step of exposing the substrate further comprises the step of providing a modifying solvent.

10. The method according to claim 9 wherein the modifying solvent is selected from the group consisting of water, lower alkyl alcohols and lower alkyl esters, phosphate esters, and mixtures thereof.

11. The method according to claim 10 wherein the modifying solvent is an ester.

12. The method according to claim 11 wherein the ester is a phosphate ester.

13. The method according to claim 12 wherein the phosphate ester is tributyl phosphate.

14. The method according to claim 1 wherein the supercritical fluid is supercritical carbon dioxide.

15. The method according to claim 1 wherein the metal species is an actinide.

16. The method according to claim 15 wherein the actinide is selected from the group consisting of uranium, plutonium, thorium, and mixtures thereof.

17. The method according to claim 1 wherein the metal species is a lanthanide.

18. The method according to claim 1 wherein the step of exposing the substrate comprises continuously flowing supercritical carbon dioxide over the substrate.

19. A method for extracting metal and metalloid species from a substrate and regenerating chelating agents and supercritical fluid solvents following the extraction, the method comprising the steps of:

exposing the substrate to supercritical fluid solvent and at least one chelating agent, the at least one chelating agent forming metal and metalloid chelates with the metal and metalloid species, the metal and metalloid chelates being soluble in the supercritical fluid solvent;

separating the metal and metalloid chelates from the substrate; and exposing the metal and metalloid chelates in the supercritical fluid solvent to an acidic solution while maintaining a pressure and/or temperature sufficient to maintain the fluid solvent supercritical, thereby causing the metal and metalloid species to be released from the metal and metalloid chelates into the acidic solution.

20. The method according to claim 19 wherein the supercritical fluid solvent comprises supercritical carbon dioxide.

21. The method according to claim 20 wherein the supercritical carbon dioxide includes a modifying solvent selected from the group consisting of water, lower alkyl alcohols, lower alkyl esters, phosphate esters, and mixtures thereof.

22. The method according to claim 21 wherein the modifying solvent is a phosphate ester.

23. The method according to claim 20 wherein the step of exposing the substrate to supercritical carbon dioxide comprises continuously flowing the supercritical carbon dioxide over the substrate.

24. The method according to claim 19 wherein the acidic solution is selected from the group consisting of nitric acid, hydrochloric acid, sulfuric acid, and mixtures thereof.

25. The method according to claim 24 wherein the acidic solution is nitric acid.

26. The method according to claim 19 wherein the at least one chelating agent remains solubilized in the supercritical fluid after the metal and metalloid species are released from the metal and metalloid chelates.

27. The method according to claim 19 wherein at least one of the chelating agents is halogenated.

28. The method according to claim 27 wherein at least one of the chelating agents is fluorinated.

* * * * *

UNITED STATES PATENT AND TRADEMARK OFFICE
CERTIFICATE OF CORRECTION

PATENT NO. : 5,792,357
DATED : August 11, 1998
INVENTOR(S) : Chien M. Wai, et. al.

It is certified that error appears in the above-identified patent and that said Letters Patent is hereby corrected as shown below:

Title page, item [75], delete "Iowa" and insert therefor --Idaho--.

In column 10, TABLE V (all occurrences), replace " + " with -- ± --.
In column 11, line 18, after the word "fluid" replace the comma with a semicolon.

Signed and Sealed this

Eleventh Day of January, 2000

Attest:

Q. TODD DICKINSON

*Attesting Officer*  *Acting Commissioner of Patents and Trademarks*